United States Patent [19]
Iizuka et al.

[11] 3,888,736
[45] June 10, 1975

[54] METHOD OF RECOVERING MICROBIAL CELLS CONTAINING PROTEIN

[75] Inventors: Hiroshi Iizuka; Naosuke Seto, both of Tokyo; Sadao Sakayanagi, Kawasaki, all of Japan

[73] Assignee: Nippon Oil Co., Ltd., Tokyo, Japan

[22] Filed: Aug. 1, 1972

[21] Appl. No.: 276,957

Related U.S. Application Data

[63] Continuation-in-part of Ser. No. 20,054, March 16, 1970, abandoned.

[30] Foreign Application Priority Data

Sept. 16, 1969 Japan ..........................44–72992

[52] U.S. Cl.................................. 195/28 R; 195/96
[51] Int. Cl............................................. C12d 13/00
[58] Field of Search........................ 195/1, 28 R, 96

[56] References Cited
UNITED STATES PATENTS
3,384,491  5/1968  Guenther et al.................. 195/28 R

*Primary Examiner*—Joseph M. Golian
*Attorney, Agent, or Firm*—Sherman and Shalloway

[57] ABSTRACT

A method of recovering protein-containing cells, which comprises culturing a microorganisms selected from the group consisting Mycobacterium cuneatum and Mycobacterium petroleophilum, bacteria belonging to the genus Mycobacterium under aerobic conditions in a culture medium containing as a carbon source selected from a mixture of $CO_2$ and $H_2$, $C_1 - C_5$ hydrocarbons and $C_{11} - C_{18}$ n-paraffins, and separating and separating and recovering cells from the culture broth.

10 Claims, No Drawings

METHOD OF RECOVERING MICROBIAL CELLS CONTAINING PROTEIN

This application is a continuation-in-part application of Ser. No. 20054 filed on Mar. 16, 1970, now abandoned.

This invention relates to a method of recovering microbial cells containing protein from a culture broth after culturing a new bacterium belonging to genus Mycobacterium utilizing a hydrocarbon as its sole carbon source. According to this method, hydrocarbons to be used as the carbon source are not so limited, and protein-containing cells can be recovered in good yields with easy culturing operation and with good culture reproducibility.

More specifically, the invention relates to a method of recovering protein-containing cells which comprises culturing under aerobic conditions a microorganism selected from the group consisting of Mycobacterium cuneatum and Mycobacterium petroleophilum, bacteria belonging to the genus Mycobacterium in a culture medium containing as a carbon source selected from a mixture of $CO_2$ and $H_2$, $C_1 - C_5$ hydrocarbons and $C_{10} - C_{18}$, preferably $C_{11} - C_{18}$ n-paraffins, such as hydrocarbon gases, a mixture of carbon dioxide and hydrogen gas, kerosene, light oils, heavy oils, and n-paraffins, and separate and recover protein-containing cells from the culture broth.

In recent years, the fermentation industry has developed methods of fermentation wherein inexpensive and readily available hydrocarbons, such as natural gas, by-product gases occurring in the cracking of petroleum naphtha and petroleum paraffins, are utilized as a carbon source in place of the conventionally used carbohydrates, and various microorganisms which assimilate such carbon sources have been discovered and reported.

Microorganism cells which assimilate these hydrocarbons have attracted much attention because they are nutrient as protein sources for foodstuff and feeds for poultry, domestic animals, and fish, and can be produced on a commercial scale in great quantities for short periods of time to provide inexpensive protein sources.

Heretofore, the research and development work in this field has been concentrated mainly on fermentations involving the use of liquid hydrocarbons such as n-paraffins as carbon sources, and there have been fewer reports made on fermentations involving gaseous hydrocarbons as carbon sources. Some hydrocarbons can be readily assimilated by microorganisms and utilized industrially, but others cannot be assimilated or assimilated only with difficulty be microorganisms and cannot be used industrially. Generally, readily assimilable hydrocarbons are considerably limited. For instance, some microorganism grows only when methane is used as a carbon source, and certain microorganisms grow only on $C_{11} - C_{18}$ n-paraffins as carbon sources. This sets a limitation on the types of hydrocarbons utilizable on a commercial basis.

This limitation constitutes a serious setback against commercial massproduction. For instance, a carbon source containing assimilable hydrocarbons must be treated in an additional step to render the hydrocarbons more readily assimilable by the intended microorganisms and commercially feasible. Omission of such an additional step has often resulted in small quantities of the end product as compared with quantities treated, because it becomes necessary to use a carbon source containing nonassimilable hydrocarbons. Furthermore, when the composition of hydrocarbons constituting the carbon source varies, the quantities of output vary and the reproducibility of culturing becomes bad. Much care and complicated procedures are therefore required.

We have screened many microorganisms isolated from cores, soils and oil brines in oil and natural gas fields, cores of stratigraphic drilling wells and swampy muds, and as a result, found those microorganisms which are able to assimilate a wide variety of hydrocarbons ranging from gaseous hydrocarbons to liquid hydrocarbons, and produce cells having a large protein content in good yields.

Accordingly, an object of the present invention is to provide a method which can overcome the above-mentioned disadvantages in a commercial scale operation and which produce protein-containing cells having a high protein content in good yields with an easy culturing procedure and excellent culture reproducibility using a wide range of hydrocarbons as a carbon source.

Many other objects and advantages of the present invention will become more apparent from the following description.

The microorganisms used in the method of the present invention have the bacteriological properties shown in Tables 1 and 2 appearing later in the present specification. As a result of comparing these properties with those of known microorganisms in accordance with the classification standard described in Bergey's "Manual of Determinative Bacteriology", 7th edition, it was found that these microorganisms belong to the genus Mycobacterium, but morphologically have no branching and are generally of a uniform clab-shaped or cuneate-shaped, and that they grow only slightly in a nutrient agar, grow at 55°C. (species shown in Table 1) and at 40°C. (species in Table 2), and grow autotrophically in the presence of a gaseous mixture of hydrogen and carbon dioxide. Based on these facts, the microorganisms used in the present invention have been identified as new organisms different from Mycobacterium paraffinicum reported by Davis in "Applied Microbilogy", Vol. 4, page 310 (1956) and Mycobacterium flavum var. methamicum reported by Netchaeva et al. in "Mikrobiolgiya", Vol. 18, page 310 (1949). Furthermore, the species shown in Table 2 was identified as a new organism different from the species given in Table 1 on the ground that it is not reducible with a nitrate, does not change milk, and does not grow at temperatures above 50°C. These two species were respectively named Mycobacterium cuneatum and Mycobacterium petroleophilum.

Strain No. 2-07 (type strain of Mycobacterium cuneatum) and strain No. 2-35 (type strain of Mycobacterium petroleophilum) were deposited in Fermentation Research Institute, Agency, of Industrial Science and Technology, Japan under deposit number of FERM-P No. 384 and FERM-P No. 385, respectively. These strains were also deposited in American Type Culture Collection under deposit numbers ATCC 21498 and ATCC 21497, respectively. The bacteriological properties of Mycobacterium cuneatum (ATCC 21498) and Mycobacterium petroleophilum (ATCC 21497) are shown in Tables 1 and 2.

Table 1

| Description of the Species | |
| --- | --- |
| Scientific name of organism | : Mycobacterium cuneatum (No. 2-07; ATCC 21498) |
| Morphology | : Rods, club-shaped or cuneate with unstained end, 0.4 to 0.7 by 1.8 to 3.2 microns. In old cultures generally shorter rods. |
| Motility | : negative |
| Gram Reaction | : positive |
| Acid-fastness | : positive |
| Yeast extract-Malt extract agar colonies | : circular, capitate, smooth, entire, amorphous, pale yellow orange, opaque, glistening |
| Nutrient agar slant | : growth poor, filiform, flat, glistening, smooth, pale yellowish brown |
| Growth PH | : 5 – 10 |
| Growth Temperature (°C) | : 20 – 55 |
| Optimum Growth Temperature (°C) | : 25 – 37 |
| Oxygen | : aerobe |
| Gelatin Liquefaction | : negative |
| Milk Reaction | : alkaline, milk unchanged |
| Starch Hydrolysis | : negative |
| Nitrate Reduction | : positive |
| Catalase Production | : positive |
| Cellulose Reaction | : none attacked |
| n-Paraffin Utilization | : utilize (see Table 3) |
| Autotrophic Growth | : grow autotrophically under a gas mixture of 33 % hydrogen, 17% carbon dioxide and 50 % air |
| Carbon Utilization | : Glucose, gluconate, citrate and succinate are utilized as sole carbon aources |
| Carbohydrate Fermentation | : Neither acid nor gas are produced from glycerol, xylose, sucrose, lactose, glucose and starch. |
| GC content of DNA (%) | : 64.9 |

Table 2

| Description of the Species | |
| --- | --- |
| Scientific name of organism | : Mycobacterium petrolephilum (No. 2-35; ATCC 21497) |
| Morphology | : Rods, club-shaped or cuneate with unstained end, 0.4 to 0.7 by 2.2 to 4.0 microns. In old cultures shorter rods or cocci. |
| Motility | : negative |
| Gram Reaction | : positive |
| Acid-fastness | : positive |
| Yeast extract-Malt extract agar colonies | : circular, capitate, smooth, entire, amorphous, pale yellow, opaque, glistening |

Table 2-Continued

| Description of the Species | |
| --- | --- |
| Nutrient agar slant | : growth poor, filiform, flat glistening, smooth, pale yellowish brown |
| Growth PH | : 5 – 10 |
| Growth Temperature (°C) | 20 – 42 |
| Optimum Growth Temperature (°C) | : 25 – 37 |
| Oxygen | : aerobe |
| Galatin Liquefaction | : negative |
| Milk Reaction | : unchanged |
| Starch Hydrolysis | : negative |
| Nitrate Reduction | : negative |
| Catalase Production | : positive |
| Cellulose Reaction | : none attacked |
| n-Paraffine Utilization | : utilize (see Table 3) |
| Autotrophic Growth | : grow autotrophically under a gas mixture of 33% hydrogen, 17% carbon dioxide and 50% air |
| Carbon Utilization | : Glucose is utilized, but gluconate, citrate and succinate are not done as sole carbon sources. |
| Carbohydrate Fermentation | : Neither acid nor gas are produced from glycerol, xylose, sucrose, lactose, glucose and starch. |
| GC content of DNA (%) | : — |

Table 3 below illustrates known species which have reported in the literature as hydrocarbon-assimilating microorganisms belonging to the genus Mycobacterium and the new species used in the present invention with respect to hydrocarbons which they assimilate.

EXPERIMENTS

Ion-exchanged pure water was added to a basal medium consisting of 1.0g $NH_4Cl$, 0.5 g $K_2HPO_4$, 0.2g $MgSO_4 \cdot 7H_2O$, 0.01g $CaCl_2 \cdot 2H_2O$ 0.001g $FeCl_3 \cdot 6H_2O$, 10μg $MoO_3$ 70μg $ZnSO_4 \cdot 7H_2O$, 5μg $CuSO_4 \cdot 5H_2O$, 10μg $H_3BO_3$, 10μg $MnSO_4 \cdot 5H_2O$, and 10μg $CoCl_3 \cdot 6H_2O$ to make 1000ml., and the pH of the solution was adjusted to 7.2 using 1N HCl and 1N NaOH aqueoue solution.

In the case of using a carbon source with 1 to 4 carbon atoms, 5 ml. of the above culture solution is put into a gas culture tube of the Thunberg type having an inner capacity of 40 ml., and sterilization was performed for 15 minutes at 120°C. and 1 atmosphere. After sterilization, a platinum loopful of microorganism was inoculated. A gaseous mixture of the following proportions

| Gaseous hydrocarbon | | |
| --- | --- | --- |
| | in the case of $C_1, C_1:$ | air=1:2(vol) |
| | in the case of $C_2, C_2:$ | air=1:3(do.) |
| | in the case of $C_3, C_3:$ | air=1:3(do.) |
| | in the case of $n-C_4, n-C_4:$ | air=1:4(do.) | was introduced into the culture tube through a sterilized filter, and shaking culture was conducted for 7 days at 30°C.

Where $C_{10}$ to $C_{18}$ n-paraffins were respectively used as a carbon source, a 50ml. test tube was charged with 10 ml. of the above culture solution, and sterilization was effected. A pre-sterilized n-paraffin was added to the culture medium in an amount of 2.0 percent by weight, and a microorganism was inoculated in the same way as mentioned above. Shaking culture was performed for 5 days at 30°C.

In the case of using a carbon source having 5 carbon atoms, the same culture tube as in the case of $C_1 - C_4$ was used, and the culturing was effected for 7 days. Otherwise, the procedure was the same as in the case of n-paraffin.

The results of the cultivating tests were shown following Table 3.

NOTE a. Evaluation of the assimilating properties was performed on a scale from +++ to − as shown below:
+++: grows strongly
++ : grows moderately
+ : grows slightly
± : grows very slightly
− : does not grow b. IFO : Institute for Fermentation, Osaka, Japan.
IAM : Institute of Applied Microbiology, University of Tokyo, Japan.

c. Literature (reference *)
1. N. B. Nechaeva; Mikrobiologiya, 18, 310–317 (1949).
2. E. N. Bokova; Mikrobiologiya, 23, 15–21 (1954).
3. D. K. Kersten; Mikrobiologiya, 32(6), 1024–1030 (1963).

Table 3

Assimilating properties of each strain on hydrocarbons

| Organisms | $H_2+CO_2$ | $C_1$ | $C_2$ | $C_3$ | $C_4$ | $C_5$ | $C_{10}$ | $C_{11}$ | $C_{12}$ | $C_{13}$ | $C_{14}$ | $C_{15}$ | $C_{16}$ | $C_{17}$ | $C_{18}$ | reference |
|---|---|---|---|---|---|---|---|---|---|---|---|---|---|---|---|---|
| Myco. methanicum[1] | + | | + | | | | | | | | | | | | | * |
| Myco. flavum var. methanicum[1],[2] | + | | + | | | | | | | | | | | | | * |
| Myco. rubrum var. propanicum[2],[3] | + | | + | + | + | | | | | | | | | | | * |
| Myco. perrugosum var. ethanicum[2] | | + | + | + | + | | | | | | | | | | | * |
| Myco. lacticolum[3],[4] | + | | + | + | | | | | | | | | | | | * |
| Myco. flavum[4] | | | | | + | | | | | | | | | | | * |
| Myco. luteum[4] | | | | | + | | | | | | | | | | | * |
| Myco. butanitrificans[6] | | | | | + | | | | | | | | | | | * |
| Myco. paraffinicum[5] ATCC 12670 | − | − | +++ | + | + | + | + | + | ++ | ++ | ++ | ++ | ++ | + | ± | |
| Mycobacterium phlei IFO 3158 | − | − | − | − | − | − | − | ± | + | + | ± | − | ± | − | − | |
| Mycobacterium smegmatis IFO 3083 | − | − | − | − | − | − | − | − | ± | ± | ± | ± | − | ± | − | |
| Nocardia corallina IFO 3338 | − | − | + | + | + | + | − | ± | + | + | ++ | + | + | − | − | |
| Micrococcus luteus IAM 1097 | − | − | − | − | − | − | − | − | ± | ± | ± | ± | ± | − | − | |
| Pseudomonas fluorescens IFO 3903 | − | − | − | − | − | − | − | − | − | ± | ± | ± | − | − | − | |
| Pseudomonas deamolytica IAM 1508 | − | − | − | − | − | − | − | − | ± | ± | ± | ± | ± | − | − | |
| Micrococcus cerificans ATCC 14987 | − | − | − | − | − | − | ± | + | ++ | ++ | ++ | + | ++ | ± | ± | |
| Pseudomonas aeruginosa IAM 1007 | − | − | − | − | − | − | ± | + | + | + | ± | ± | − | ± | − | |
| Nocardia opaca ATCC 17039 | − | − | ++ | + | ++ | + | − | + | ++ | ++ | ++ | + | ± | ± | − | |
| Nocardia rubra ATCC 15096 | − | − | − | − | − | − | − | ± | + | + | + | ± | + | ± | − | |
| Mycobacterium cuneatum ATCC 21498 (Present invention) | +++ | +++ | +++ | +++ | +++ | +++ | ++ | ++ | +++ | +++ | +++ | +++ | +++ | +++ | +++ | |
| Mycobacterium petroleophilum ATCC 21497 (Present Invention) | +++ | +++ | +++ | +++ | +++ | +++ | +++ | +++ | +++ | +++ | +++ | +++ | +++ | +++ | +++ | |

4. Z. P. Telegina; Mikorbiologiya, 35 (6), 1059–1063 (1966).
5. J. B. Davis, H. H. Chase and R. L. Raymond; Appln. Mikorbiol., 4 (6), 310–315 (1956).
6. V. F. Coty; Biotechnol, Bioeng., 9, 25–32 (1967).

As is seen from the results shown in Table 3, the new species used in the present invention are markedly different from, and characteristic over, the known species in that the new species assimilate all of $H_2 + CO_2$ and $C_1 - C_5$ hydrocarbons and also $C_{10} - C_{18}$ n-paraffins.

The culture medium used in the process of the present invention contains as a carbon source $CO_2 + H_2$ or a hydrocarbon selected from the group consisting of $C_1 - C_5$ hydrocarbons and $C_{10} - C_{18}$ n-paraffins, and usually contains a nitrogen source, preferably minerals in addition. As such carbon source, we can specifically mention liquid hydrocarbons such as kerosene, light oil, heavy oil and n-paraffins. Especially n-paraffins are readily assimilable by microorganisms of this invention, and usually $C_5 - C_{30}$ n-paraffins are employed. $C_6 - C_9$ n-paraffins are not desirable in a fermentation operation because they are a bit less assimilable by microorganisms of this invention, and with an increasing number of carbons, they become solid. Therefore, $C_5$ and $C_{10} - C_{18}$ n-paraffins are especially preferably as the liquid hydrocarbons.

The hydrocarbon selected from $C_1 - C_5$ hydrocarbons, and $C_{10} - C_{18}$ n-paraffins, as used in the present invention, is a term including not only a carbon source consisting essentially of one or more of these hydrocarbons but also a carbon source consisting of a major amount, usually above 50 percent by weight, of one or more of these hydrocarbons and a minor amount of other hydrocarbons.

As a gaseous carbon source, we can cite a gaseous mixture of $CO_2$ and $H_2$, methane, ethane, propane and n-butane either alone or in mixtures.

When a gaseous carbon source is used, washing and centrifugal separating procedures with water or organic solvents need not be repeated to separate the cells from the hydrocarbon after the end of culturing, unlike the case of using a liquid hydrocarbon as the carbon source. The use of gaseous hydrocarbons therefore have a big advantage that the cells can be easily purified. Moreover, the use of gaseous hydrocarbons removes the unsuitability of the obtained cell cake as foodstuff or feed which is ascribable to the remaining of a tar content containing undesirable impurities such as benzpyrene in the case of using liquid hydrocarbons.

This renders the method of the present invention more advantageous in a commercial scale practice in conjunction with the fact that the microorganisms used in the invention assimilate both $CO_2$ and gaseous hydrocarbons (see Table 3), namely, a far wider range of gaseous hydrocarbons can be utilized as carbon sources by the microorganisms of the present invention.

Furthermore, it is possible to use as a carbon source liquefied petroleum gas consisting mainly of propane and butane, by-product gases consisting predominantly of hydrogen and methane discharged from the naphtha cracking apparatus or fuel gases discharged from the petroleum refining apparatus, which have heretofore found applications chiefly as fuels. This renders the method of the invention economically advantageous. Furthermore, the microorganisms used in present invention are markedly characterized in that carbon dioxide and hydrogen can be used as a source of energy.

Usually, the culture medium used in the present invention contains a nitrogen source besides the carbon source hereinbefore described. As such nitrogen source, we can mention organic nitrogen sources such as urea, pepton, meat-extract, yeast-extract, malt-extract, and amino acids and inorganic nitrogen sources such as ammonium chloride, ammonium nitrate, sodium nitrate, potassium nitrate, ammonium sulfate, ammonium hydrogenphosphate, ammonium dihydrogenphosphate and sodium nitrite.

It is preferred that the culture medium used in the present invention further contains minerals, examples of which are dipotassium phosphate, potassium phosphate, disodium phosphate, sodium phosphate, magnesium sulfate, magnesium chloride, calcium chloride, ferric chloride, ferrous fulfate and ferric sulfate. Preferably, the culture medium further contains a critical amount of an inorganic salt such as molybdenum oxide, zinc sulfate, copper sulfate, boric acid, manganese sulfate and cobalt chloride. It is sufficient that the amounts of minerals are about $5 \times 10^{-7}$ to $5 \times 10^{-2}$ percent based on the weight of the medium solution.

Liquid hydrocarbons as a carbon source can be used in an amount of 1 – 10 percent by weight, preferably 3 – 5 percent by weight, based on the total weight of the culture medium. On the other hand, gaseous hydrocarbons should be preferably fed in an amount of 50 – 500 percent by volume (at 30°C.), preferably 80 – 200 percent by volume, based on the total volume of the culture medium. In a continuous method, either fewer or more amounts can be used as the waste gas can be recycled.

The amounts of the nitrogen source may vary over a considerably wide range, but most commonly 0.02 – 0.5 percent by weight, preferably 0.1 – 0.2 percent by weight can be used on the basis of the total weight of the culture medium.

In the case of using liquid hydrocarbons as a carbon source, a small amount, for instance, 0.05 percent by weight or less, based on the total weight of the culture medium, of a surface active agent such as those of the tween type or span type can be added to the culture medium, if desired.

Some examples of the culture medium suited for use in the present invention excepting a carbon source are as follows:

a. Aqueous medium with a ph adjusted to 7.2 which has been prepared by dissolving in one liter of tap water 1 g of $NH_4Cl$, 0.5 g of $K_2HPO_4$, 0.2 g of $MgSO_4.7H_2O$, 0.01 g of $CaCl_2.2H_2O$, 0.001 g of $FeCl_3.6H_2O$, 10 μg of $MoO_3$, 70 μg of $ZnSO_4.7H_2O$, 5 μg of $CuSO_4.5H_2O$, 10 μg of $H_3BO_3$, 10 μg of $MnSO_4.5H_2O$ and 10 μg of $CoCl_3.6H_2O$.

b. Aqueous medium with a pH adjusted to 7.2 which has been prepared by dissolving in one liter of tap water 1 g of $NH_4Cl$, 0.5 g $Na_2HPO_4$, 0.2 g of $KH_2PO_4$, 0.2g of of $Na_2HPO_4$, 0.2 g of $KH_2PO_4$, 0.2 g of $MgSO_4.7H_2O$, 0.01 g of $CaCl_2.2H_2O$, 0.001 g of $FeCl_3.6H_2O$, 10 μg of $MoO_3$, 70 μg of $ZnSO_4.7H_2O$, 5 μg of $CuSO_4.5H_2O$, 10 μg of $H_3BO_3$, 10 μg of $MnSO_4.5H_2O$ and 10 μg of $CoCl_3.6H_2O$.

c. Aqueous medium with a pH adjusted to 7.2 which has been prepared by dissolving into one liter of tap water 2 g of $NaNO_3$, 0.5 g of $Na_2HPO_4$, 0.2 g of $KH_2PO_4$, 0.2g of $MgSO_4.7H_2O$, 0.01 g of $CaCl_2.2H_2O$, 0.002 g of $FeSO_4.7H_2O$, 10 μg of $MoO_3$, 70 μg of $ZnSO_4.7H_2O$, 5 μg of $CuSO_4.5H_2O$, 10 μg of $H_3BO_3$, 10 μg of $MnSO_4.5H_2O$ and 10 μg of $CoCl_3.6H_2O$.

Prior to inoculating microorganisms in a culture medium, sterilization of the culture medium is carried out in accordance with a customary method. Most commonly, heat sterilization can be effected at 120° ± 10°C. for about 15 to 30 minutes. When a liquid hydrocarbon is used, it is recommendable that a culture medium which does not contain a carbon source is sterilized in advance, and a presterilized liquid hydrocarbon is added to the culture medium. When a gaseous carbon source is used, it is a usual practice to inoculate a strain in a heat sterilized culture medium, and introduce a gaseous mixture of a gaseous hydrocarbon and air or oxygen or a gaseous mixture of carbon dioxide, hydrogen and air or oxygen through a sterilizing filter.

When a gaseous carbon source is used, the employment of pressure culturing leads to an increase of solubility of the carbon source in a culture liquor.

In addition, depending upon the degree of pressure, the gaseous carbon source is readily liquefied, and in the liquid state, is assimilated by microorganisms. This is effective also in inhibiting the generation of heat in a fermentation process, and an increase in the yield of cells can be expected.

The culturing temperature that can be employed in the invention ranges from about 20° to about 40°C., preferably 25° – 35°C., more preferably 30° ± 3°C. The pH of the culture medium that can be used in the invention is about 5 to about 10, preferably 6 to 8. Culturing is effected under aerobic conditions, and known aerobic culturing means such as a batchwise shaking culture method and a continuous stirring culture method can be employed in the presence of a molecular oxygen-containing gas, such as oxygen, air or a mixture thereof.

The culturing time may vary depending upon the strain used, composition of the culture medium, carbon source used, culturing temperature, pH of the culturing means, but is usually from 3 to 10 days, preferably from 5 to 7 days.

After the end of culturing, cells are separated and recovered from the culture broth, and if desired, subjected to purification.

When a gaseous hydrocarbon or carbon dioxide is used as the carbon source, it is sufficient that cells in the culture broth are separated and recovered by centrifugal separation after the end of culturing, followed by washing 2 or 3 times with tap water for instance, and freeze-drying or spray-drying. On the other hand, when a liquid hydrocarbon is used as the carbon source, a preferred recovering procedure involves adding an aqueous solution containing a surface active agent to the culture liquid after the end of culturing, washing and centrifugally separating cells, and washing and extracting them further with an organic solvent such as hexane, ethyl ether, acetone, LPG (butane, propane), and a chlorinated hydrocarbon solvent to remove the remaining hydrocarbon sufficiently, further centrifugally separating them, washing them with tap water 2 or 3 times, and then freeze-drying or spray-drying.

The obtained protein-containing cells have a high protein content, and an abundance of vitamines. They can be utilized as excellent protein sources as feeds for domestic animals, poultry and cultivated fish, either directly or after processing.

Several embodiments of the method of the invention will be described below by working examples.

EXAMPLE 1

$NH_4Cl$ (1 g), $K_2HPO_4$ (0.5 g), $MgSO_4.7H_2O$ (0.2g), $CaCl_2.2H_2O$ (0.01 g), $FeCl_3.6H_2O$ (0.001 g), $MoO_3$ (10 μg), $ZnSO_4.7H_2O$ (70 μg), $CuSO_4.5H_2O$ (5 μg), $H_2BO_3$ (10 μg), $MnSO_4.5H_2O$ (10 μg) and $CoCl_3.6H_2O$ (10 μg) were dissolved in 1 liter of tap water and the pH was adjusted to 7.2. 100 ml of the so formed culture medium was put into a 500-ml glass flask and sterilized at 120°C. for 20 minutes. Then, one platinum-loopful or Mycobacterium cuneatum ATCC 21498 was inoculated onto the culture medium, and a mixed gas of methane and air at a volume ratio of 1:2 was introduced into the glass flask through a sterilizing filter. The culturing was conducted at 30°C. for 7 days under shaking.

Cells growing in the culture broth were centrifugally separated and recovered. The collected cells were washed three times with tap water, and freeze-dried. The gas compositions before and after culturing were determined by gas chromatography analysis. The yield of the cells was 45 percent by weight based on methane consumed during culturing, and the protein content of the dried cells was 55.0 percent by weight. The amino acid composition and vitamine content of the cells are shown in Table 4. This table also illustrates the amino acid composition and vitamine content of the cells obtained in Example 10 which will be given hereinafter.

TABLE 4

| Amino Acid Composition and Vitamin Content | | | | |
|---|---|---|---|---|
| Example No. | | | 1 | 10 |
| Strains | | | Mycobacterium cuneatum ATCC 21498 | Mycobacterium petroleophilum ATCC 21497 |
| Carbon source | | | Methane | Propane |
| Amino acid composition (weight % | Essential amino acids | Leucin | 6.93 | 6.62 |
| | | Isolecucin | 3.87 | 3.74 |
| | | Valine | 5.70 | 5.17 |
| | | Threonine | 4.45 | 4.21 |
| | | Methionine | 2.80 | 1.38 |
| | | α-Lysine | 4.42 | 4.15 |
| | | Phenylalanine | 3.38 | 3.75 |
| | | Triptophane | — | — |
| | | Arginine | 6.10 | 5.58 |
| | | Histidine | 1.90 | 1.98 |

Table 4 —Continued

| Amino Acid Composition and Vitamin Content | | | | |
|---|---|---|---|---|
| Example No. | | | 1 | 10 |
| Strains | | | Mycobacterium cuneatum ATCC 21498 | Mycobacterium petroleophilum ATCC 21497 |
| Carbon source | | | Methane | Propane |
| based on proteins) | | Cystine | 0.32 | 0.32 |
| | | Serine | 3.08 | 3.87 |
| | | Glutamic acid | 10.00 | 11.00 |
| | Non-essential amino acids | Proline | 3.97 | 3.92 |
| | | Glycine | 4.88 | 5.56 |
| | | Alanine | 7.69 | 8.34 |
| | | Tyrosine | 2.36 | 2.41 |
| | | Aspartic acid | 7.59 | 8.31 |
| Vitamin content (mg/Kg) | | Vitamin $B_1$ | 22 | 17 |
| | | Vitamin $B_2$ | 44 | 48 |
| | | Vitamin $B_6$ | 150 | 148 |
| | | Vitamin $B_{12}$ | 10.8 | 9.8 |
| | | Nicotinic acid | 168 | 178 |
| | | Pantothenic acid | 32 | 30 |

EXAMPLE 2

A culture medium (1 liter) having the same composition as the medium formed in Example 1 was put into a cylindrical culturing tank and sterilized at 120°C. for 20 minutes. Mycobacterium cuneatum ATCC 21498 (0.01 g) was inoculated into the culture medium. 10 liters of a mixed gas of a by-product gas discharged from a naphtha cracking apparatus (containing as main components 24.5 percent of hydrogen and 73.5 percent of methane) and air at a volume ratio of 1:2 was charged into a gas holder, and supplied circulatingly to the culturing tank through a sterilizing filter by means of a pump. The culturing was conducted at 28°C. for 5 days under continuously circulating mixed gas. Then, the culture broth was treated in the same manner as in Example 1. The yield of the resulting cells was 42 percent by weight based on the consumed by-product gas, and the protein content of the dried cells was 56.8 weight percent.

EXAMPLE 3

A mixed gas of carbon dioxide gas and hydrogen (carbon dioxide: hydrogen volume ratio being 1:2) was mixed with air at a volume ratio of 1:1. By employing the so formed mixed gas consisting of carbon dioxide gas, hydrogen and air, Mycobacterium cuneatum ATCC 21498 was cultured at 30°C. for 7 days using the same culture medium and procedure set forth in Example 1. Cells were centrifugally separated from the culture broth, washed three times with tap water and dried in a drier. The yield of the cells was 37 percent by weight based on the consumed carbon dioxide gas, and the protein content of the dried bacterium was 52.4 weight percent.

EXAMPLE 4

Each of Mycobacterium cuneatum ATCC 21498 and Mycobacterium petroleophilum ATCC 21497 was cultured at 30°C. for 7 days using the same culture medium and procedure set forth in Example 1 except that ethane was used as carbon surce and a mixed gas of ethane and air at a volume ratio of 1:3 was fed to a culturing tank. The culture broth was treated in the same manner as in Example 1. The yield of the cells was 41 percent by weight and 40 percent by weight, respectively based on consumed ethane and the protein content of the dried cells was 54.0 weight percent and 53.5 weight percent respectively.

For comparison, the above procedure was repeated using Mycobacterium paraffinicum ATCC 12670. The results are shown in Table 5 together with those obtained above.

Table 5

| Organisms | Yield of the cell (% by wt.) | Protein content of the dried cells (% by wt.) |
|---|---|---|
| Mycobacterium cuneatum ATCC 21498 | 41 | 54.0 |
| Mycobacterium petroleophilum ATCC 21497 | 40 | 53.5 |
| Mycobacterium paraffinicum ATCC 12670 (comparison) | 39 | 41.7 |

These results demonstrate that the yield of cells was almost the same for all these runs, but that the protein content of the cells in accordance with the present invention was about 10 percent larger than that of the comparison, showing a marked improvement in the practice of the process on a commercial scale.

EXAMPLE 5

Mycobacterium cuneatum ATCC 21498 was cultured at 28°C. for 5 days using the same culture medium and procedure set forth in Example 1 except that a liquefied petroleum gas (containing as main components 18 percent of propane and 76 percent of n-butane) was used as carbon source and a mixed gas of this liquefied petroleum gas and air at a volume ratio of 1:3 was fed to a culturing tank. The culture broth was treated in the same manner as in Example 3. The yield of the cells was 39.5 percent by weight based on the consumed liquefied petroleum gas and the protein content of the dried bacterium was 56.2 percent by weight.

EXAMPLE 6

Mycobacterium cuneatum ATCC 21498 was cultured at 30°C. under shaking for 7 days in a culture medium prepared by adding 0.05 percent of a surfactant "Tween 40" (trade-mark, product of Atlas Chemical Ind. Inc.) to the culture medium used in Example 1. As carbon source a mixture of n-paraffins of 10 – 18 carbon atoms was added to the culture medium in an amount of 3 g per 100 ml of the culture medium. Cells were centrifugally separated from the culture broth. Unreacted n-paraffins, sticking to the cells were removed by washing with hexane and warm water, followed by freeze-drying. The yield of the cells was 73 percent by weight based on added n-paraffins and the protein content of the dried cells was 56 weight percent.

EXAMPLE 7

Mycobacterium petroleophilum ATCC 21497 was cultured at 30°C. for 7 days using the same culture medium and procedure set forth in Example 1 by employing methane as carbon source. The culture broth was treated in the same manner as in Example 1. The yield of the cells was 43.5 percent by weight based on consumed methane and the protein content of the dried cells was 54.8 weight percent.

EXAMPLE 8

Mycobacterium petroleophilum ATCC 21497 was cultured at 28°C. for 5 days using the same culture medium and procedure set forth in Example 1 by employing as carbon source the by-product gas used in Example 2. The culture broth was treated in the same manner as in Example 2. The yield of the cells was 40.0 percent by weight based on the consumed by-product gas and the protein content of the dried cells was 52.2 percent by weight.

EXAMPLE 9

Mycobacterium petroleophilum ATCC 21497 was cultured at 30°c. for 7 days using the same culture medium and procedure set forth in Example 1 except that propane was used as carbon source instead of methane and a mixed gas of propane and air at a volume ratio of 1:3 was fed to a culturing tank. Then, the culture medium was treated in the same manner as in Example 1. The yield of the cells was 38.5 percent by weight based on consumed propane and the protein content of the dried cells was 56.3 percent by weight. The amino acid composition and vitamine content are shown in Table 4.

EXAMPLE 10

Mycobacterium petroleophilum ATCC 21497 was cultured at 30°C for 7 days under shaking in a culture medium obtained by adding 0.05 percent of a surfactant "Tween 40" (trade-mark, product of Altas Chemical Ind. Inc.) by adding as carbon source a light oil (initial boiling point = 202°C.; final boiling point = 374°C.; paraffin content = 22 weight percent) to the culture medium in an amount of 3 g 100 ml of the culture medium. Then, the culture broth was treated in the same manner as in Example 6. The yield of the cells was 17 percent by weight based on the added light oil and the protein content of the dried cells was 55.6 weight percent.

We claim:

1. A method of recovering protein-containing cells, which comprises culturing a microorganisms selected from the group consisting of Mycobacterium cuneatum and Mycobacterium petroleophilum, bacteria belonging to the genus Mycobacterium under aerobic conditions in a culture medium containing as a carbon source selected from a mixture of $CO_2$ and $H_2$, $C_1 - C_5$ hydrocarbons and $C_{11} - C_{18}$ n-paraffins, and separating and recovering cells from the culture broth.

2. The method of claim 1 wherein said culture medium additionally contains a nitrogen source.

3. The method of claim 2 wherein said culture medium further contains mineral.

4. The method of claim 2 wherein said nitrogen source is selected from the group consisting of ammonium chloride, ammonium sulfate, ammonium nitrate, sodium nitrate, potassium nitrate, ammonium hydrogenphosphate, ammonium dehydrogenphosphate and urea.

5. The method of claim 3 wherein said mineral is selected from the group consisting of dipotassium phosphate, potassium phosphate, disodium phosphate, sodium phosphate, magnesium sulfate, magnesium chloride, calcium chloride, ferric chloride, ferrous sulfate, ferric sulfate, molybdenum oxide, zinc sulfate, copper sulfate, boric acid, manganese sulfate and cobalt chloride.

6. The method of claim 1 wherein the culturing is carried out at a temperature of about 20° to about 40°C. at a pH of about 5 to about 10.

7. The method of claim 6 wherein the culturing temperature is 25° – 35°C., and the pH of the culture medium is 6 to 8.

8. The method of claim 1 wherein said carbon source is gaseous.

9. The method of claim 8 wherein said carbon source is a geseous carbon source containing at least 50 percent by weight of a gas selected from the group consisting of a mixture of $CO_2$ with $H_2$, methane, ethane, propane, butane, and mixtures thereof.

10. The method of claim 1 wherein said carbon source is a liquid carbon source containing at least 50 percent by weight of a liquid selected from the group consisting of $C_5$ and $C_{11} - C_{18}$ liquid hydrocarbons and mixtures thereof.

* * * * *